United States Patent
Sadja et al.

(10) Patent No.: US 8,413,200 B2
(45) Date of Patent: *Apr. 2, 2013

(54) CABLE TELEVISION VIEWING STATISTICS

(75) Inventors: Aran London Sadja, La Jolla, CA (US); Eric James Holcomb, San Marcos, CA (US); Leo M. Pedlow, Jr., Ramona, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 155 days.

This patent is subject to a terminal disclaimer.

(21) Appl. No.: 12/986,315

(22) Filed: Jan. 7, 2011

(65) Prior Publication Data

US 2011/0099570 A1    Apr. 28, 2011

Related U.S. Application Data

(62) Division of application No. 11/037,836, filed on Jan. 18, 2005, now Pat. No. 7,895,632.

(60) Provisional application No. 60/544,601, filed on Feb. 12, 2004.

(51) Int. Cl.
*H04N 7/173* (2011.01)
*H04N 7/16* (2011.01)
*H04N 17/00* (2006.01)

(52) U.S. Cl. ........ 725/107; 725/111; 725/116; 725/131; 725/146; 725/151; 725/25; 348/180

(58) Field of Classification Search .................. 725/107, 725/111, 116, 131, 146, 151, 25; 348/180
See application file for complete search history.

(56) References Cited

U.S. PATENT DOCUMENTS

| | | |
|---|---|---|
| 4,385,384 A | 5/1983 | Rosbury et al. |
| 4,780,910 A | 10/1988 | Huddleston et al. |
| 5,099,348 A | 3/1992 | Huddleston et al. |
| 5,245,420 A | 9/1993 | Harney et al. |
| 5,604,528 A | 2/1997 | Edwards et al. |
| 5,798,785 A | 8/1998 | Hendricks et al. |
| 5,961,604 A | 10/1999 | Anderson et al. |
| 6,067,440 A | 5/2000 | Diefes |
| 6,112,232 A | 8/2000 | Shahaur et al. |
| 6,177,931 B1 | 1/2001 | Alexander et al. |

(Continued)

OTHER PUBLICATIONS

Anonymous, "What is a Cable Modem," SearchSecurity.com, Aug. 2003.

*Primary Examiner* — Hoang-Vu A Nguyen-Ba
(74) *Attorney, Agent, or Firm* — Miller Patent Services; Jerry A. Miller

(57) ABSTRACT

A cable television method for a cable television network involves sending a polling message to a modem forming a part of a television set top box from a cable television headend via a cable television cable connection to the set top box; wherein the polling message instructs the cable television set top box to report a currently tuned channel of the television set top box; receiving a response message from the cable television set top box transmitted by the modem and containing the currently tuned channel of the television set top box; and compiling the currently tuned channel information from a plurality of set top boxes received in response messages to determine actual program viewing statistics for a television time slot during which the polling responses were sent. This abstract is not to be considered limiting, since other embodiments may deviate from the features described in this abstract.

10 Claims, 7 Drawing Sheets

U.S. PATENT DOCUMENTS

| | | |
|---|---|---|
| 6,308,328 B1 | 10/2001 | Bowcutt et al. |
| 6,588,016 B1 | 7/2003 | Chen et al. |
| 6,651,092 B1 | 11/2003 | Muraoka |
| 6,687,907 B1 | 2/2004 | Bortolini |
| 6,745,392 B1 | 6/2004 | Basawapatna et al. |
| 6,754,908 B1 | 6/2004 | Medvinsky |
| 6,757,909 B1 | 6/2004 | Maruo et al. |
| 7,328,451 B2 | 2/2008 | Aaron |
| 2001/0049620 A1* | 12/2001 | Blasko ............................. 705/10 |
| 2002/0138830 A1* | 9/2002 | Nagaoka et al. ................ 725/14 |
| 2002/0141348 A1 | 10/2002 | Swix et al. |
| 2003/0048380 A1 | 3/2003 | Tamura |
| 2003/0145323 A1* | 7/2003 | Hendricks et al. .............. 725/34 |
| 2004/0070601 A1 | 4/2004 | Staiger |
| 2004/0088729 A1 | 5/2004 | Petrovic et al. |
| 2004/0261116 A1 | 12/2004 | Mckeown et al. |
| 2005/0066353 A1 | 3/2005 | Fransdonk |
| 2005/0114880 A1 | 5/2005 | Gould |
| 2005/0155069 A1 | 7/2005 | LaJoie et al. |
| 2006/0099980 A1* | 5/2006 | Nielsen et al. ................. 455/507 |
| 2007/0022459 A1* | 1/2007 | Gaebel et al. .................. 725/114 |
| 2012/0102523 A1* | 4/2012 | Herz et al. ...................... 725/34 |

\* cited by examiner

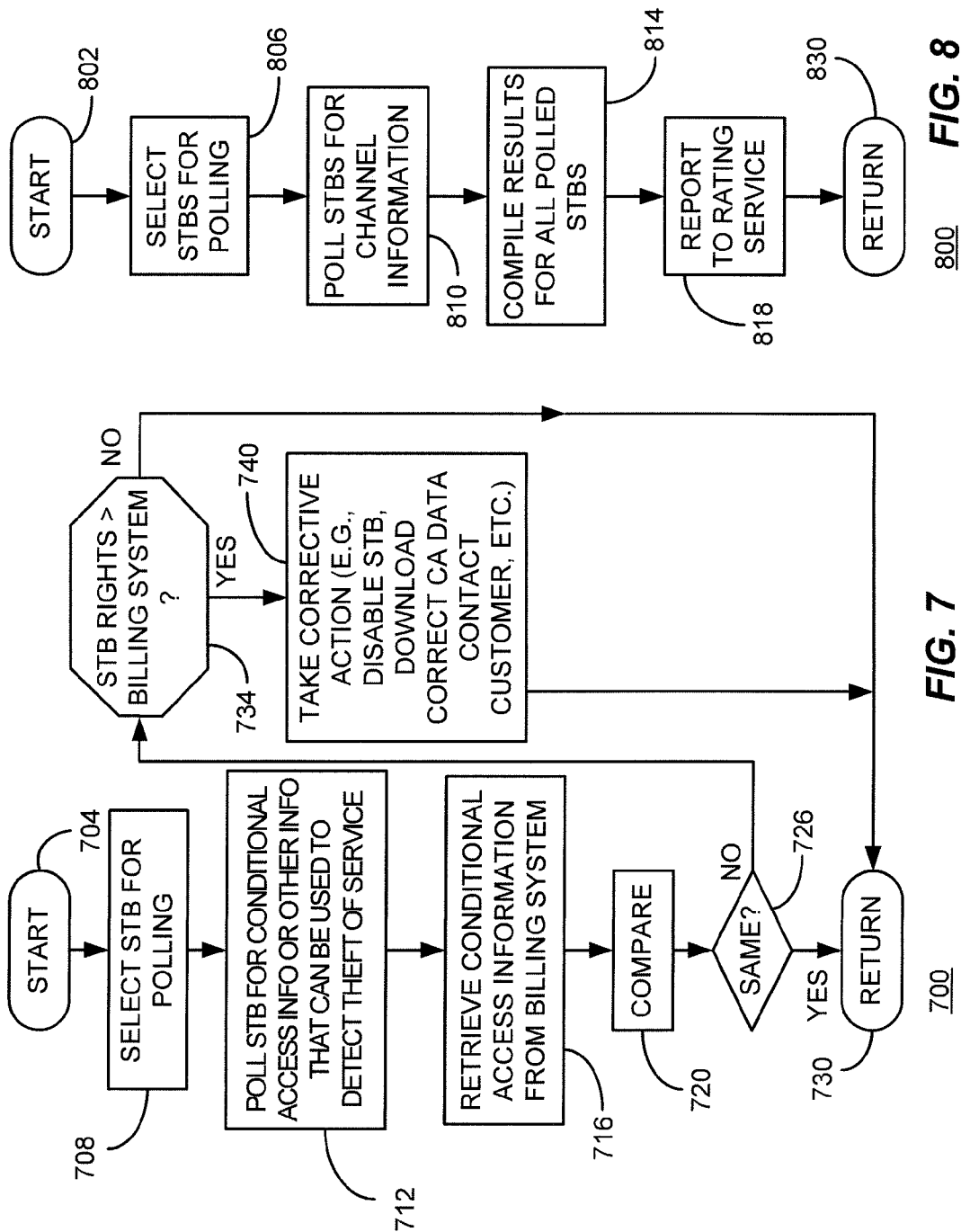

CABLE TELEVISION VIEWING STATISTICS

CROSS REFERENCE TO RELATED DOCUMENTS

This application is a divisional application of U.S. patent application Ser. No. 11/037,836 filed Jan. 18, 2005 now U.S. Pat. No. 7,895,632 to Sadja, et al. entitled "Cable Diagnostic and Monitoring System" which claims priority benefit of U.S. Provisional Patent Application No. 60/544,601 filed Feb. 12, 2004 to Sadja et al., priority to both of which are claimed and both of which are hereby incorporated herein by reference.

COPYRIGHT NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever.

BACKGROUND

The complexity and scope of present two way digital cable networks eclipse its analog predecessor. The demand for unimpaired service availability and network robustness has been elevated as customer acceptance and dependency has grown for services such as telephony, broadband data services, video-on-demand and extensive channel offerings, all enabled by the digital revolution in cable television. These services provide revenue sources for cable operators, but depend upon networks with high fidelity. The barrier separating error-free reception and complete loss of service is often less than a decibel in signal level.

Operators faced with the requirement for improved service, reduced downtime and twenty four hour per day network availability are also facing the need to reduce capital expenditure, service calls and personnel costs. Current solutions for extensive network monitoring are both cost prohibitive and have limited scope of information as well as limited observability, often only providing data for a node or trunk and not to each subscriber tap or customer premise equipment (CPE).

Cable network infrastructures can vary from plant-to-plant, node-to-node and trunk-to-trunk. From mode hopping lasers and noisy amplifiers to ranging cable modems, operators are challenged by a diverse set of issues that may seem impossible to troubleshoot with any one existing technology.

BRIEF DESCRIPTION OF THE DRAWINGS

Certain illustrative embodiments illustrating organization and method of operation, together with objects and advantages may be best understood by reference detailed description that follows taken in conjunction with the accompanying drawings in which:

FIG. 7 is a flow chart of an exemplary process for a set top box operation consistent with certain embodiments of the present invention.

FIG. 8 is a flow chart of an exemplary process for gathering information for a rating service in a manner consistent with certain embodiments of the present invention.

DETAILED DESCRIPTION

Figure 1:
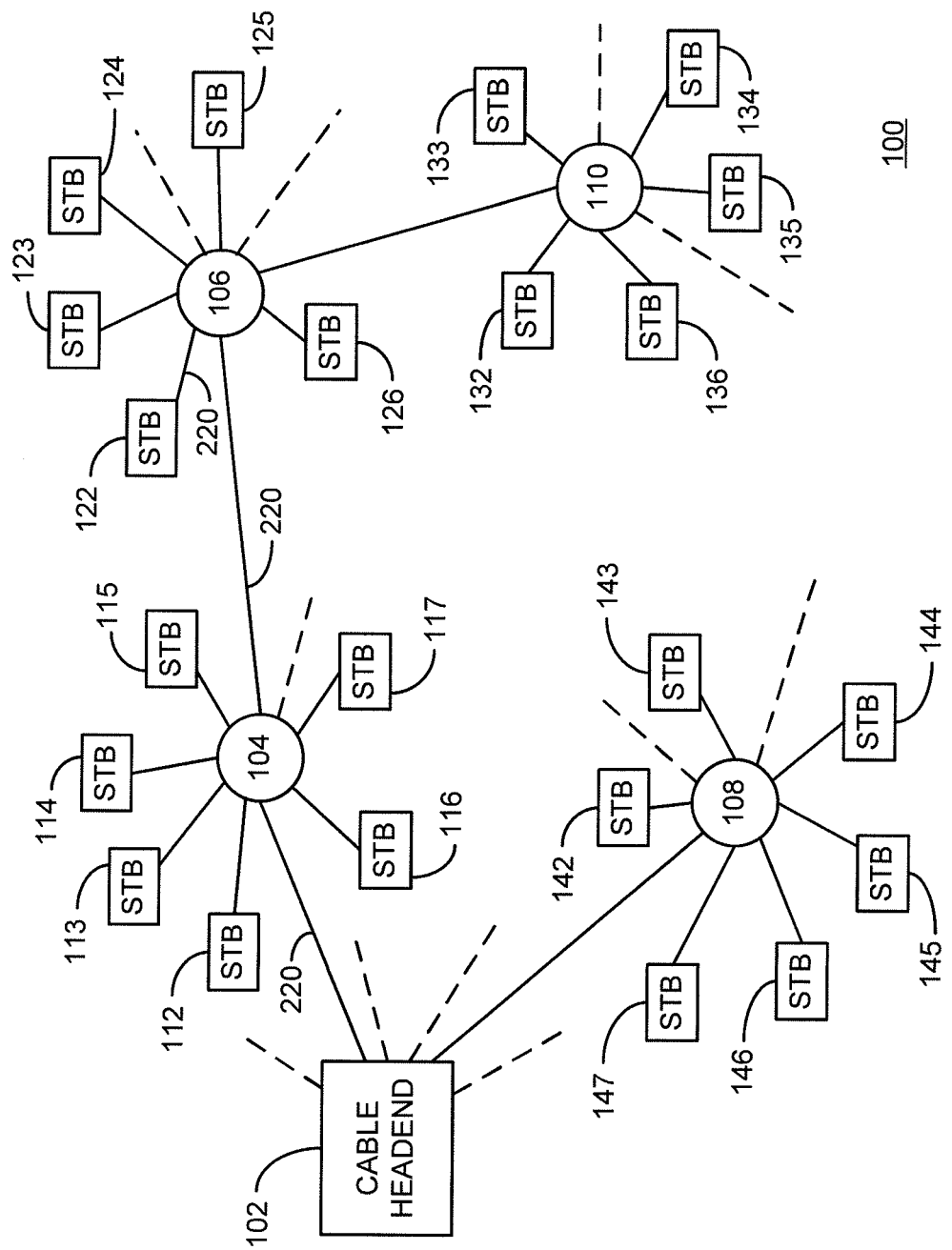
FIG. 1 is a diagram of an exemplary portion of a cable network consistent with certain embodiments of the present invention.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program", as used herein, is defined as a sequence of instructions designed for execution on a computer system. A "program", or "computer program", may include a subroutine, a function, a procedure, an object method, an object implementation, in an executable application, an applet, a servlet, a source code, an object code, a shared library/dynamic load library and/or other sequence of instructions designed for execution on a computer system.

Reference out this document to "one embodiment", "certain embodiments", "an embodiment" or similar terms means that a particular feature, structure, or characteristic described in connection with the embodiment is included in at least one embodiment of the present invention. Thus, the appearances of such phrases or in various places out this specification are not necessarily all referring to the same embodiment. Furthermore, the particular features, structures, or characteristics may be combined in any suitable manner in one or more embodiments without limitation.

This document describes methods and apparatus allowing cable operators to gather extensive metrics on their entire network, including transports and channels, all the way from the headend to each subscriber device. Information can be aggregated and presented in a web-based tool providing operations staff at any level with information of variable scope at the network, node, tap or device level. Exemplary systems can include assignable watermarks for warnings and alarms that in turn automatically activate email, text messaging and paging systems. Trend data can be obtained at selectable intervals and this data can be stored indefinitely for future auditing, quality assurance (QA), analysis or other purposes. Because the granularity of scope is user selectable, quick determination of where a system fault has occurred can more easily be made, allowing deterministic action to be taken before a call center is flooded with customer complaints. It also facilitates reduction of service labor costs and unnecessary truck rolls (service calls) because problems can be more accurately pinpointed. Problems localized to wiring or other problems at a customer sites can generally be determined without having to dispatch representatives on-site. In many cases, these issues, the source of which having been conclusively identified, may then be delegated to customer service agents and handled over the telephone with the subscriber.

All this capability comes without the need to purchase and deploy costly and complex specialized test equipment and the data server can be hosted on an inexpensive personal computer (PC) or similar device. The information is made available using existing communications within the subscriber device and extensions to standard protocols.

Turning now to FIG. 1, an exemplary cable television system 100 is depicted incorporating a cable television headend 102. The cable television headend 102 receives programming from satellite links and other sources which are merged with locally generated content and advertising for distribution out the cable system. In the example shown, the headend 102 distributes content via cable media such as 220 to any number of branches having distribution points or hubs (collectively referred to as nodes) such as node 104, 106, 108, and 110. The dashed lines in FIG. 1 depict additional distribution links in the cable system that are not shown for clarity.

In the example shown, node 104 distributes the cable television signal to a collection of set top boxes 112, 113, 114, 115, 116, and 117. In addition, node 104 delivers content again via media 220 to node 106. Node 106 distributes content directly to set top boxes 122, 123, 124, 125, and 126. Node 106 also feeds node 110 which delivers content to set top boxes 132, 133, 134, 135, and 136. Numerous such chains of distribution nodes may exist in any given cable system. System 100 further depicts node 108 which is fed directly from cable headend 102. Node 108 delivers content to set top boxes 142, 143, 144, 145, 146, and 147. Node 108, as well as nodes 104, 106, and 110, may also feed additional nodes which serve as signal repeaters and distribution points within the network.

Before describing the operation of the system in detail, it is useful to consider an exemplary set top box block diagram. While considering the functionality of the digital set top box, it is noted that the STB contains functionality that can be used to effectively operate as an extremely powerful diagnostic tool situated at each installation. Each STB contains a powerful computer, a digital television receiver and a high speed modem that together can function to provide on-demand subscriber information, network information and diagnostics that places a great deal of power at the fingertips of the network operator.

Figure 2:
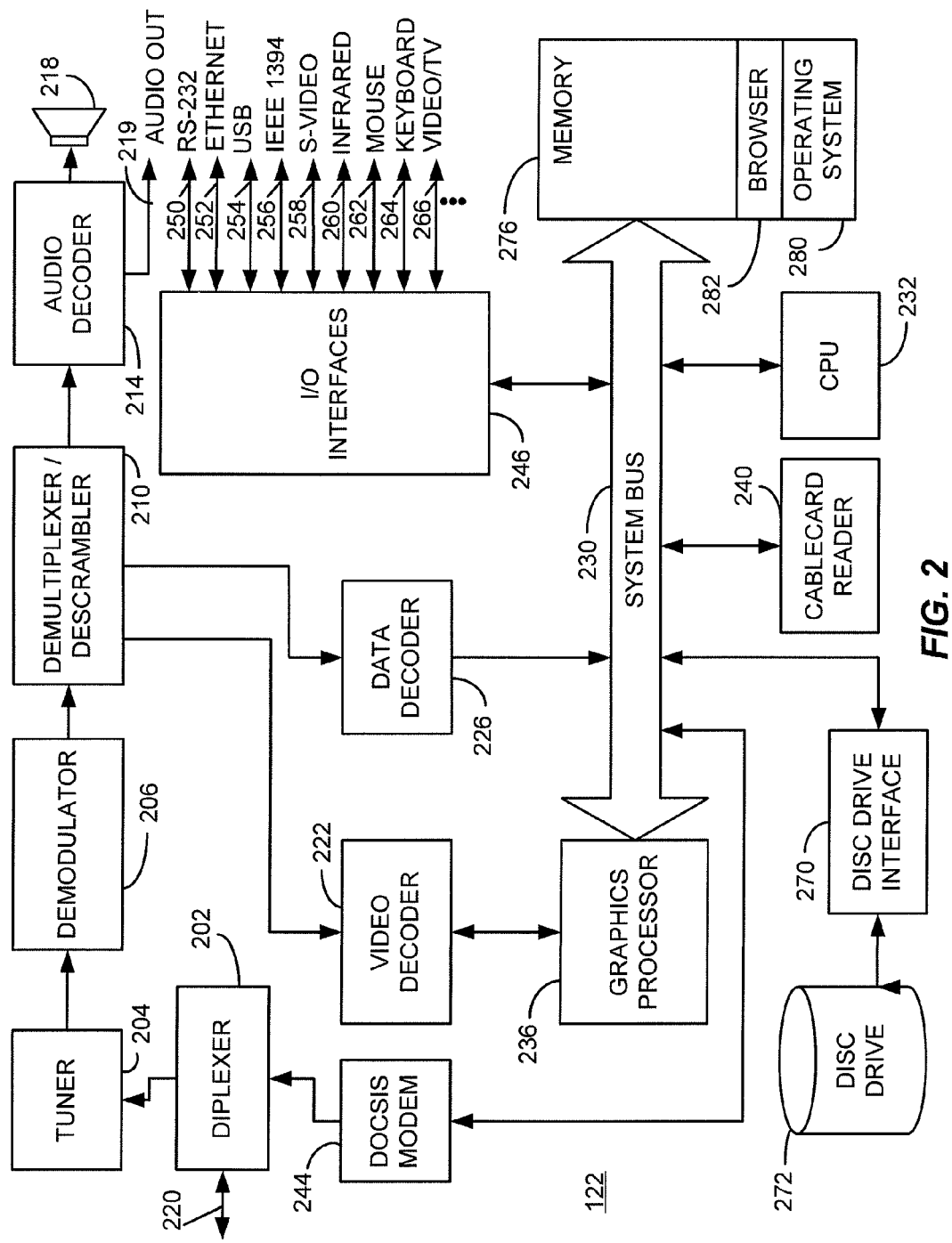
FIG. 2 is a block diagram of an illustrative digital television set top box with integrated modem consistent with certain embodiments of the present invention.

Referring now to FIG. 2, an exemplary system configuration for a digital set-top box 122 is illustrated. In this exemplary set-top box, the transmission medium 220, such as a coaxial cable, is coupled by a suitable interface a diplexer 202 to an in-band tuner 204. Tuner 204 may, for example, include an in-band tuner for receiving video content. A return path diplexer 202 provides an OOB return path for outbound data (destined for example for the head end 102). A separate tuner (not shown) may be provided to receive conventional RF broadcast television channels. Modulated information formatted, for example, as MPEG-2 information is then demodulated at a demodulator 206. The demodulated information at the output of demodulator 206 is provided to a demultiplexer and descrambler circuit 210 where the information is separated into discrete channels of programming The programming is divided into packets, each packet bearing an identifier called a Packet ID (PID) that identifies the packet as containing a particular type of data (e.g., audio, video, data). The demodulator and descrambler circuit 210 also decrypts encrypted information in accordance with a decryption algorithm to prevent unauthorized access to programming content, for example.

Audio packets from the demultiplexer 210 (those identified with an audio PID) are decrypted and forwarded to an audio decoder 214 where they may be converted to analog audio to drive a speaker system (e.g., stereo or home theater multiple channel audio systems) or other audio system 218 (e.g., stereo or home theater multiple channel amplifier and speaker systems) or may simply provide decoded audio out at 219.

Video packets from the demultiplexer 210 (those identified with a video PID) are decrypted and forwarded to a video decoder 222. In a similar manner, data packets from the demultiplexer 210 (those identified with a data PID) are decrypted and forwarded to a data decoder 226.

Decoded data packets from data decoder 226 are sent to the set-top box's computer system via the system bus 230. A central processing unit (CPU) 232 can thus access the decoded data from data decoder 226 via the system bus 230. Video data decoded by video decoder 222 are passed to a graphics processor 236, which is a computer optimized to processes graphics information rapidly. Graphics processor 236 is particularly useful in processing graphics intensive data associated with Internet browsing, gaming and multimedia applications such as those associated with MHEG (Multimedia and Hypermedia information coding Experts Group) set-top box applications. It should be noted, however, that the function of graphics processor 236 may be unnecessary in some set-top box designs having lower capabilities, and the function of the graphics processor 236 may be handled by the CPU 232 in some applications where the decoded video is passed directly from the demultiplexer 210 to a video encoder. Graphics processor 236 is also coupled to the system bus 230 and operates under the control of CPU 232.

Many set-top boxes such as STB 122 may incorporate a smart card reader or CableCard™ reader 240 for communicating with a so called "smart card" or CableCard™ often serving as a Conditional Access Module (CAM). The CAM may include a central processor unit (CPU) of its own along with associated RAM and ROM memory. Reader 240 is used to couple the system bus of STB 122 to the smart card or CableCard™ serving as a CAM (not shown). Such smart card or CableCard™ based CAMs are conventionally utilized for authentication of the user and authentication of transactions carried out by the user as well as authorization of services and storage of authorized cryptography keys. For example, the CAM can be used to provide the key for decoding incoming cryptographic data for content that the CAM determines the user is authorized to receive.

STB 122 can operate in a bidirectional communication mode so that data and other information can be transmitted not only from the system's head end to the end user, or from a service provider to the end user of the STB 122, but also, from the end user upstream using an out-of-band channel. In one embodiment, such data passes the system bus 230 to DOCSIS (Data Over Cable System Interface Specification) compliant modem 244 the diplexer 202 and out the transmission medium 220. In other embodiments, a separate modulator may be provided. This capability is used to provide a mechanism for the STB 122 and/or its user to send information to the head end (e.g., service requests or changes, registration information, etc.) as well as to provide fast outbound communication with the Internet or other services provided at the head end to the end user. Thus, the STB 122 can carry out bidirectional communication via the DOCSIS cable modem with the STB 122 being identified by a unique IP address. The DOCSIS specification is publicly available.

Set-top box 122 may include any of a plurality of I/O (Input/Output) interfaces represented by I/O interfaces 246 that permit interconnection of I/O devices to the set-top box 122. By way of example, and not limitation, a serial RS-232 port 250 can be provided to enable interconnection to any suitable serial device supported by the STB 122's internal software. Similarly, communication with appropriately compatible devices can be provided via an Ethernet port 252, a USB (Universal Serial Bus) port 254, an IEEE 1394 (so-called Firewire™ or i-Link™) or IEEE 1394 wide port 256, S-video port 258 or infrared port 260. Such interfaces can be utilized to interconnect the STB 122 with any of a variety of accessory devices such as storage devices, audio/visual devices 226, gaming devices (not shown), Internet Appliances 228, etc.

I/O interfaces 246 can include a mouse port 262 to facilitate connection to a mouse or similar controller. A PS/2 or other keyboard/mouse/joystick interface such as 264 can be provided to permit ease of data entry to the STB 122. Such inputs provide the user with the ability to easily enter data and/or navigate using pointing devices. Pointing devices such as a mouse or joystick may be used in gaming applications.

Of course, STB 122 also may incorporate basic video outputs 266 that can be used for direct connection to a television set instead of (or in addition to) an IEEE 1394 connection. In one embodiment, Video output 266 can provide composite video formatted as NTSC (National Television System Committee) video or high definition video. In some embodiments, the video output 266 can be provided by a direct connection to the graphics processor 236 or the demultiplexer/descrambler 210 rather than passing the system bus 230 as illustrated in the exemplary block diagram. S-Video signals from output 258 can be similarly provided without passing the system bus 230 if desired in other embodiments.

The infrared port 260 can be embodied as an infrared receiver to receive commands from an infrared remote control, infrared keyboard or other infrared control device. Although not explicitly shown, front panel controls may be used in some embodiments to directly control the operation of the STB 122 a front panel control interface as one of interfaces 246. Selected interfaces such as those described above and others can be provided in STB 122 in various combinations as required or desired.

STB 122 will more commonly, as time goes on, include a disc drive interface 270 and disc drive mass storage 272 for user storage of content and data as well as providing storage of programs operating on CPU 232. In such embodiments, STB 122 functions as a PVR or DVR (Personal Video Recorder or Digital Video Recorder). STB 122 may also include floppy disc drives, CD ROM drives, CD R/W drives, DVD drives, etc. CPU 232, in order to operate as a computer, is coupled the system bus 230 (or a multiple bus architecture) to memory 276. Memory 278 may include a combination any suitable memory technology including Random Access Memory (RAM), Read Only Memory (ROM), Flash memory, Electrically Erasable Programmable Read Only Memory (EEPROM), etc.

While the above exemplary system including STB 122 is illustrative of the basic components of a digital set-top box suitable for use with the present invention, the architecture shown should not be considered limiting since many variations of the hardware configuration are possible without departing from the present invention. The present invention could, for example, also be implemented in other architectures such as that disclosed in U.S. Pat. No. 6,757,909 filed Dec. 29, 1999, to Jun Maruo and Atsushi Kagami. This patent describes a set-top box using a multiple bus architecture with a high level of encryption between components for added security. This application is hereby incorporated by reference as though disclosed fully herein.

In general, during operation of the STB 122, an appropriate real time operating system 280 is loaded into, or is permanently stored in, active memory along with the appropriate drivers for communication with the various interfaces. In certain embodiments, operating systems such as Microsoft Corporation's Windows CE™ could be used without departing from the present invention. Along with the operating system and associated drivers, the STB 122 operates using browser software 282 in active memory or may permanently reside in ROM, EEPROM or Flash memory, for example. The browser software 282 operates as the mechanism for viewing not only web pages on the Internet, but also serves as the mechanism for viewing an Electronic Program Guide (EPG) formatted as an HTML document. The browser 282 can also provide the mechanism for viewing normal programming (wherein normal programming is viewed as an HTML video window—often occupying the entire area of the screen).

STB software architectures vary depending upon the operating system. However, in general, such architectures include, at the lowest layer, various hardware interface layers. Next is an operating system layer, as previously described. The software architectures of the modem digital STB have generally evolved to include a next layer referred to as "middleware." Such middleware permits applications to run on multiple platforms with little regard for the actual operating system in place. Middleware standards are still evolving at this writing, but are commonly based upon Javascript and HTML (hypertext Markup Language) virtual machines. At the top layer is the application layer where user applications and the like reside (e.g., browsing, email, EPG, Video On Demand (VOD), rich multimedia applications, pay per view, etc.). Embodiments consistent with the current invention can be utilized with any suitable set-top box software and hardware architecture that can support the functions to be described.

With one-way technologies, determining the quality of signal at the customers' premises required the customer to call in and complain. The operator then faced the challenge of determining whether the issue was confined to the customer's location or if it was an area wide issue, affecting a branch, node or an entire hub. If no other customers complain, it could be assumed that the issue was localized but without further information, it might be impossible to conclusively determine without a service call, in which case a service technician can be dispatched to the location, costing the operator in both time and human resources, to determine the specific source and location of the problem.

With two-way technology, in accordance with certain embodiments consistent with the present invention, every customer device can play a role in monitoring the cable plant's health. A cable modem can help ascertain the health of the signal and assist in determining the physical location of the customer. Additionally, two-way capable STBs containing DOCSIS modems can provide more than just video and program guide services to the customer. The STB can keep the operator apprised of every aspect of the STB in the customer's house, ranging from the current video PID to the CA security device ID. This enhanced use of two-way communications allows the cable operators to monitor their plant, with a seamless logical extension of the plant past the tap to the actual devices in the subscriber's home. Thus, for the first time operators are provided the opportunity to monitor the network its endpoints, not just the infrastructure.

The cable modem is the customer's high-speed gateway to the Internet. In order to stay online, a cable modem performs a continuous electronic repartee with the Cable Modem Termination System (CMTS) and in the process creates a plethora of useful network information stored on both the cable modem and CMTS and available thru the open simple network management protocol (SNMP) standard.

The DOCSIS specification requires all cable modems to be SNMP capable and that the MIBs (Management Information Base) and OIDs (Object IDentifiers) comply with standardized values. Because of this, every CableLabs certified cable modem responds in a uniform way to a standard SNMP request. This provides the operator with the freedom to choose any (or multiple) cable modem manufacturer(s) and never have to change the method of acquiring data.

The type of data available on the cable modem ranges from simple to obscure. Whether the operator wants to know if a cable modem is online, or a technician is concerned with the number of T3 Timeouts, this information is accessible certain monitoring tool embodiments consistent with the present invention.

One of the pieces of information available to the operator is the ability to get live reports on signal health, one element of which is the upstream power as sent by an individual cable modem. When a cable modem has to transmit at high output levels to communicate with the CMTS, a monitoring tool consistent with certain embodiments can help differentiate whether the issue is indicative of a poor return path due to a problem at the customer's site or a node wide issue.

In some ways, both cable modems and digital STBs are more finicky about signal levels and quality then their analog predecessors. In analog systems, picture quality degraded proportional to the degradation of the incoming signal quality. In contrast, the magic and curse of digital transmission is that it provides visually perfect, error free or near error free picture quality until the signal is degraded to a certain point, and then the complete transmission is lost. In many cases, the transition between perfection and total loss may only be a fraction of a decibel. It is important to maintain proper levels across a plant to provide consistent service and margins. By polling cable modems at regular intervals and following trends in signal levels, it is possible to detect current and even predict future equipment failures on the delivery infrastructure.

Through SNMP it is also possible to track a customer's cable modem should it make its way to another part of the system. With certain embodiments consistent with the present invention, it is possible to determine with a fair degree of accuracy, where that cable modem is physically located, and from previous polls, where it should have been located, based on the time tick value, the upstream and downstream frequencies and which CMTS interface it is communicating on. When linked to the billing system, the monitoring tool can provide the operator with specific customer information for each cable modem and STB.

The data available on the cable modem can help an operator at any level determine a problem with a single cable modem or with a whole trunk. This information is not only available remotely, but can proactively monitor, alert, and even maintain a cable plant's health.

The digital two way STB can be viewed as the customer interface to the digital television realm, providing the user with a crystal clear image and an electronic program guide. However, with a two-way capable STB implementing the open TCP/IP standard, the set top box can also become a cable provider's most reliable monitoring tool, irrespective of whether the television is on or off.

Unlike cable modems, there is yet to be a standardized interface for remote diagnostics on digital STBs, but the use of SNMP on a network-attached STB can provide a wealth of information. Set top boxes such as 122 which have an integrated DOCSIS cable modem can use a standardized Management Information Base (MIBs) to allow easy integration of any two-way STB onto a monitored cable plant.

Whether the STB has an integrated DOCSIS cable modem, an Ethernet connection or another method of communication, the data available from each subscriber's STB can prove valuable to the operator. For example, thru the exemplary system, a region-wide STB software upgrade can be scheduled and embodiments of the present tool can provide an upgrade report as well as schedule subsequent upgrade attempts for failed boxes. If a set to box repeatedly refuses the upgrade, embodiments of the present tool can alert the operator, who can then take appropriate action.

Information about the digital video signal is also available on the STB. A digital cable STB can essentially be viewed as a debug tool embedded in the customers' home. While decoding the video, the set top box is also monitoring various aspects of the signal and this information is available via SNMP. Mismatched audio & video PIDs can easily be detected by a poll of the system, quadrature amplitude modulation (QAM) data, downstream power levels, bit error rates (BER), signal-to-noise ratio (SNR), mislabeled channel descriptors and any other information specified in the MIB can be monitored. In the event of a customer call, this information can be used to assist the support technician in determining the cause of the problem.

CA (Conditional Access) information is also made available thru remote diagnostics. Theft of service can be addressed real-time monitoring of CA using the monitoring tool consistent with certain embodiments of the present invention, as will be described later. When tied into the billing system, the monitoring tool can track pay per view (PPV) or video on demand (VOD) purchases, check when the last account report-back occurred, compare service tier to actual viewing, and in the case of a roaming or rogue access cards or devices, an alert can be sent out and the offending card then be deactivated.

Additionally, a cable operator may want to take advantage of the fact that real-time viewing statistics and habits can be gathered from the STB, within the privacy limits allowed by law. A system poll can tell the operator how many STBs are tuned to any particular channel, and stored data can be analyzed and used for marketing purposes, as will be explained later.

One hurdle in creating a plant-wide monitoring system is gathering the appropriate data. Unfortunately, a typical digital cable plant may ultimately have equipment from a number of different vendors, each one possibly using their own proprietary remote monitoring system. In such circumstances, a comprehensive monitoring tool might be expected to require a lengthy and costly upgrade for each individual system, the difficulty of obtaining an API (Application Programming Interface) from the vendor to communicate with their equipment not withstanding.

Fortunately for multiple service operators (MSOs), most manufacturers do not create their own remote data query system and protocols. Instead, they use one of two major open-standard systems. The two most frequently used methods for gathering data are currently the open-standard SNMP (Simple Network Management Protocol) and the open-standard HTTP (HyperText Transfer Protocol) using XML (eXstensible Markup Language) or HTML (HyperText Markup Language) each of which are open-standards.

The DOCSIS specification requires, and CableLabs ensures, that every DOCSIS cable modem is equipped with a simple SNMP agent and responds to a standard set of requests. This provides a uniform interface to the cable modem, regardless of manufacturer.

The rest of a cable plant may not be as simple to monitor. Luckily, SNMP is the prevailing choice for remote diagnostics due to its explicit design as a standardized method of "Network Management". Any SNMP enabled device found in the headend will respond to SNMP requests, including all network infrastructures (CMTS, routers, etc) and most servers (Linux & Windows based).

Another common remote query method used by equipment manufactures is by performing an HTTP GET request and parsing the response data. The data is returned in either in XML or HTML format, which can easily be parsed and the appropriate data extracted, or the data is returned in HTML, as a diagnostics web page from which the appropriate data can also be parsed and extracted.

In rare cases, the manufacturer may not provide a remote diagnostics interface, in which case a simple network connectivity test can help infer whether the device has crashed, is hung-up or has lost power. The use of open standards by manufacturers allows headend equipment to be remotely monitoring with a single tool that can then analyze and present the data.

In order for a large monitoring system to gather and store data over extended periods of time in order to examine trend information and detect possible future failures based on that data, the data should preferably be stored in a conveniently accessible fashion. In one embodiment, the open-standard database query language, SQL (Structured Query Language) can be used. The use of SQL allows the monitoring tool to communicate, sans modification, with any SQL standard adhering commercial or freeware database, providing the tool with a multitude of options for data storage.

Effective monitoring begins in the headend, ensuring the core systems of the cable operator are functioning as expected and providing early detection of problems. Certain embodiments consistent with the present invention use various communication paths to aggregate headend systems status. All SNMP (Simple Network Management Protocol) and HTTP (Hyper-Text Transfer Protocol) enabled devices can be polled on scheduled intervals for status updates. Information about video/data delivery, device statuses and real-time log files can be stored on a centralized monitoring server thru the use of databases and the Linux syslog service. By monitoring and analyzing the incoming data, based on MSO defined criteria, the system can automatically take scripted response actions and/or alert appropriate personal pagers, text messaging, email or other means. This allows efficient problem notification and resolution, minimizes downtime, and reduces maintenance costs. This data are also accessible via HTTP any standard web browser for operators to examine at their convenience from anywhere in the private, or alternatively, in the public Internet.

Video services are protected by monitoring source devices such as satellite receivers, remultiplexers, rate-shaping groomers, modulators and upconverters. On-demand video systems benefit from the ability to monitor items such as server CPU loads, memory usage, as well as application specific metrics maximizing uptime and system availability for these advanced services. It is also prudent to monitor the programming to ensure that the premium channels are encrypted, while the clear channels remain in the clear.

Based upon the operators' settings, the appropriate support staff can be notified when there is an Asynchronous Serial Interface (ASI) input failure on a modulator, an oversubscription on a transport passing a grooming device, or excessive CPU load on a cluster of VOD servers. Using MSO defined thresholds, problems can be averted or corrected with early warnings triggered by a known pattern of events leading to system failures. In many cases, problems can be detected by effective application of thresholds before they become service affecting from a subscriber perspective and corrective action taken prior to noticeable impairment being reported via a flood of calls to a call center.

Data services can be protected by monitoring network infrastructure and related provisioning servers. Everything from the core backend routers to edge devices such as the CMTS are monitored and the data displayed in a network centric web interface. Detailed information about the health of the hybrid fiber coax (HFC) network as it relates to the data services is analyzed and presented as it is gathered via SNMP from a DOCSIS CMTS.

Bandwidth utilization, modems per node, metrics on upstream/downstream interfaces and modem RF power can be stored and analyzed providing real-time analysis or historical trend data for the delivery system. Alerts can be targeted to specific personnel specializing in the type of trouble or equipment reporting the malfunction, streamlining problem resolution.

Once the data have been collected and possibly stored the final challenge in creating a versatile solution is providing an interface, notification and response system that is accessible, intuitive, customizable, and capable of filtering the massive quantity of data accumulated while monitoring a cable plant. To make the data available to the widest audience possible it is advantageous to use an existing open-standard protocol such as hypertext transport protocol (HTTP) or the "web". The use of HTTP allows worldwide access to the data thru any browser-enabled device, ensuring availability to technicians with a computer, cell phone, personal digital assistant (PDA), etc. The data presented can be filtered depending on the device and user, optimizing the time needed to diagnose a problem.

One aspect that has proven both attractive and effective for a major cable operator was to provide key field staff inexpensive laptop PCs and cable modems. This allowed these personnel to access the monitoring data in the field from any available cable network tap to evaluate, in real time, the effect of their corrective actions on the aggregate and individual downstream customers.

The present monitoring system embodiment provides alarm and warning notifications. Gathering data for presentation is useful, but requires constant monitoring in order to repair problems as soon as they arise. To be a proactive monitoring system, definable alarms and subsequent notifications are provided in embodiments consistent with the present invention. The use of the open-standard, SMTP (Simple Mail Transport Protocol) to email notifications allows a multitude of devices to receive the warnings (computers, pagers, telephones, Personal Digital Assistants, etc.).

All the data can be sorted and formatted for presentation; visual contrasts (colors, font, size etc.) can be used to delineate sources of information and to indicate warnings and alarms. Additionally, personnel can have a customized view of the data that addresses their specific needs.

For security, the web interface can either be made publicly available, or a user authentication system can be used to protect the pages. Monitoring system administrators have a separate login and can adjust alarm watermarks, data sources, email recipients and other aspects of the present tool the web.

Email alerts can be fully customizable and can be sent to any number of recipients and different alarms can be sent to only the appropriate personnel. It is also possible to tailor the notifications to the receiving device; a terse version of the alert can be sent to pagers, cell phones and other mobile devices, while a fully detailed message is sent to standard email accounts. Other embodiments will occur to those skilled in the art upon consideration of the present teaching.

Arrangements consistent with certain embodiments can also be configured to perform automated responses to failures that have definable remedies, e.g. When a device fails, the monitoring tool can switch the system over to a backup device or when a simple power-cycle is the accepted resolution to an issue, the monitoring tool can contact the network-attached power-switch to reset the equipment.

Referring back to FIG. 1, as noted it has heretofore been difficult to diagnosis problems within a network such as 100 in a proactive manner. Generally, the cable system operator awaits a service complaint to be called in to a service number. Upon receipt of such a complaint, a service technician is generally dispatched to the site to ascertain the cause of the problem. However, if the various set top boxes in the system can behave as diagnostic tools in and of themselves, the source of many problems can be resolved quickly and efficiently. By way of example, consider a problem with set top box 122. If cable headend 102 is able to determine that set top box 122 is malfunctioning for some reason and that set top box 122 is the only set top box malfunctioning among those connected to node 106, then a technician can readily isolate the problem to either the set top box, a transmission or reception port at node 106, or the transmission media 220 between set top box 122 and node 106.

However, if the cable system headend 102 were able to query each of set top boxes 122, 123, 124, 125, and 126 to determine if they also are experiencing similar problems or are marginal in their operation, the technician could focus on resolving the issue at node 106 and/or transmission line 220 between node 104 and 106. Thus, in accordance with embodiments consistent with the present invention, it is desirable to be able to poll individual set top boxes for operational parameters that are useful in diagnosing a fault within the set top box itself, as well as within the network.

By way of example, a signal strength parameter or an error rate parameter associated with all of the set top boxes connected to 106 can be aggregated and analyzed to determine if there is a common signal strength problem associated with set top boxes connected to node 106.

Figure 3:
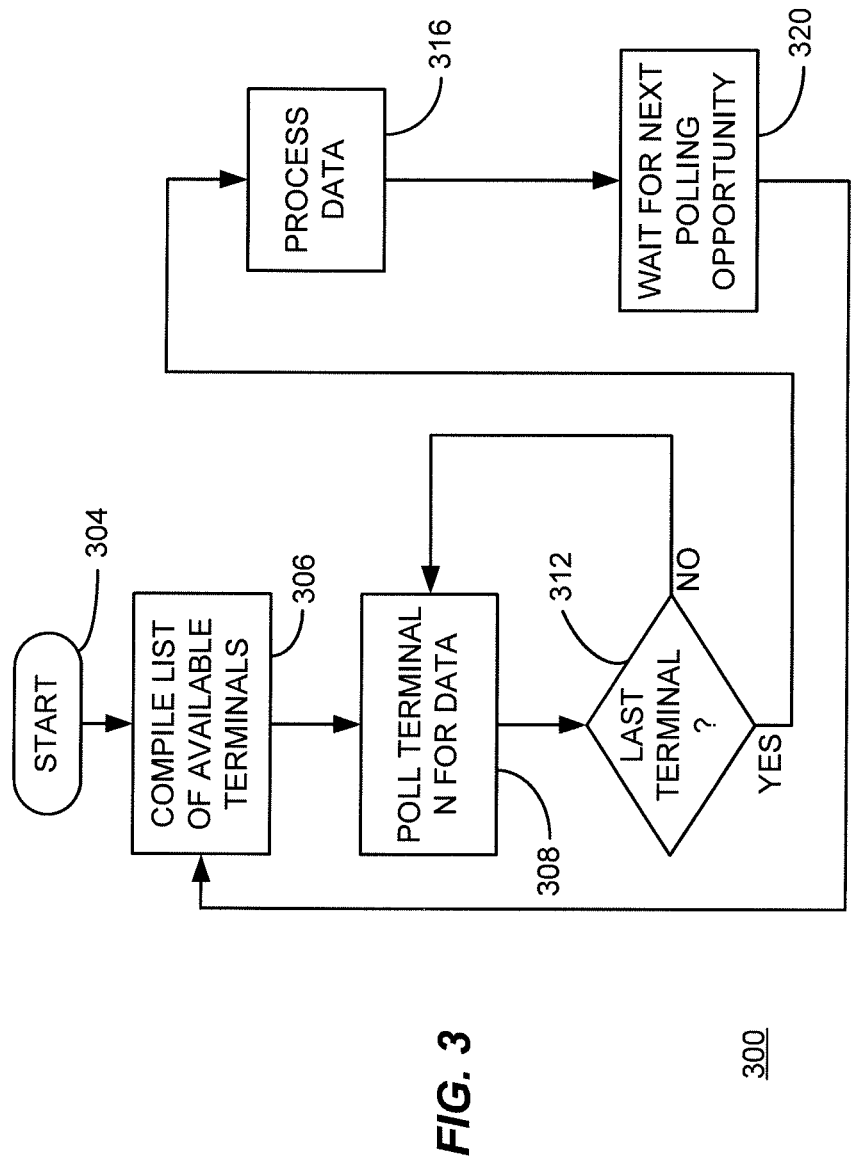
FIG. 3 is a flow chart of an exemplary overall polling process consistent with certain embodiments of the present invention.

One process that might be used, for example, in carrying out such a diagnosis is depicted as process 300 of FIG. 3. This process starts at 304 and proceeds to 306 where a list of available terminals is compiled. At 308, each of the terminals is sequentially polled until the last terminal is reached at 312. This polling process may involve a query from the cable system headend for a specific item of data or for a standard collection of data that is routinely requested. Once the data are received, the data are processed at 316 (as will be described later), and then the process proceeds to 320 in order to await another polling opportunity.

Figure 4:
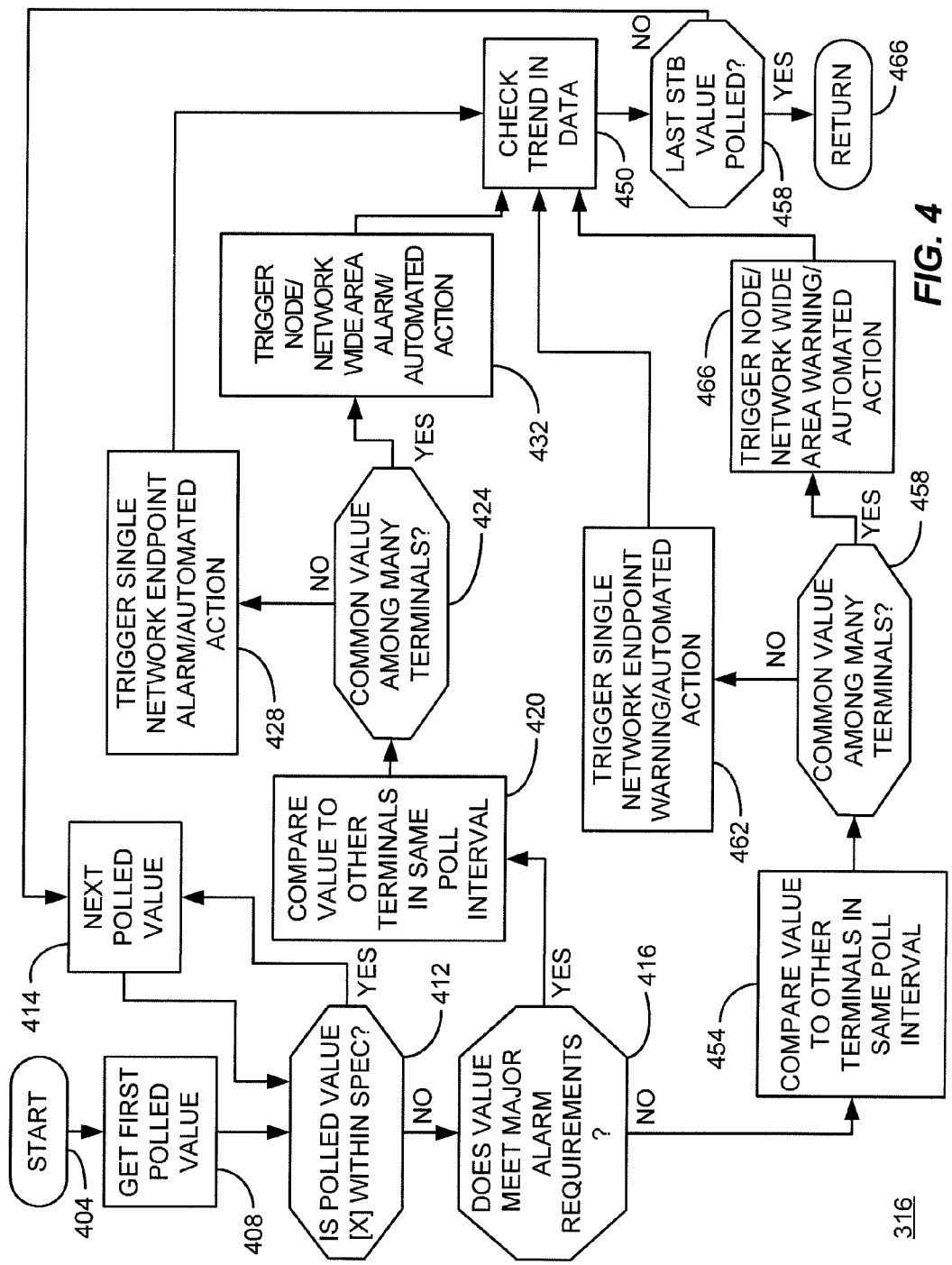
FIG. 4 is a flow chart of an exemplary data processing process consistent with certain embodiments of the present invention.

The data analysis of 316, in one exemplary embodiment, can be carried out according to the flow chart of FIG. 4 starting at 404. At 408, a first poll value is retrieved and compared at 412 with a specification. The specification may be a set of minimum standards established by the operator or manufacturer, or may be a set of historical values surrounded by a small error window. If the polled value meets the required specification at 412, the next polled value is retrieved at 414 and compared with the specification at 412. However, if the polled value is outside the specification limits at 412, a determination is made at 416 as to whether or not the polled value meets a major alarm requirement. If so, the value is compared to other terminals in the same polling interval at 420. At 424, the system determines whether or not a common value or common type of error is occurring among many of the terminals (set top boxes). If not, an alarm is triggered at 428 indicating that a single endpoint is experiencing a problem, and an automated action to resolve the problem may be initiated.

If a common value or type of error is occurring among a number of terminals at 424, one can deduce that the problem may be either node-wide or network-wide, and appropriate alarm or automated action can be initiated at 432 as a result. In either case, from 428 or 432, control passes to 450 where the data can be checked to determine if a trend can be spotted which might be useful in assisting diagnosis of the source of the problem. Control passes from 450 to 458 where it is determined whether or not the last set top box value has been polled. If not, control passes back to 414 where the next polled value is retrieved and process repeats. If the last set top box value has been polled and processed at 458, the process returns at 466.

Referring back to block 416, if the value does not meet major alarm requirements, the value can be compared at 454 with values from other terminals that are retrieved during the same polling interval. If no common value or type of error is occurring among multiple terminals at 458, control passes to 462 where a single network endpoint warning or automated action can be carried out. From 462, control passes to 450. If a common value or type of error is occurring among multiple terminals at 458, it can be deduced that the error is the result of a node problem or a network-wide problem at 466, and an appropriate warning or an automated action can be carried out at 466. Control then passes to 450 as previously.

Thus, A cable television diagnostic method for a cable television network consistent with certain embodiments involves sending a polling message to a plurality of modems forming a part of a plurality of television set top boxes from a cable television headend via a cable television cable connection to the set top boxes; wherein the polling message instructs the cable television set top boxes to obtain at least one operational parameter of each of the television set top boxes; receiving a plurality of response messages from the cable television set top boxes, each containing the at least one operational parameter of the television set top boxes; determining that one of the operational parameters from one of the television set top boxes is outside of a specified range of values; and aggregating the operational parameters of the plurality of set top boxes received in the response messages to determine if the same operational parameter is outside the range of specified values for more than the one of the television set top boxes.

In another embodiment, a cable television diagnostic method for a cable television network involves sending a polling message to a plurality of modems forming a part of a plurality of television set top boxes from a cable television headend via a cable television cable connection to the set top boxes; wherein the polling message instructs the cable television set top boxes to obtain at least one operational parameter of each of the television set top boxes; receiving a plurality of response messages from the cable television set top boxes, each containing the at least one operational parameter of the television set top boxes; determining that one of the operational parameters from one of the television set top boxes is outside of a specified range of values; aggregating the operational parameters of the plurality of set top boxes received in the response messages to determine if the same operational parameter is outside the range of specified values for more than the one of the television set top boxes; if not, generating an error notification for the one television set top box; if so, determining if a common signal path or node exists in the cable television network for the more than one television set top box; and if a common signal path or node exists in the cable television network for the more than one television set top box, generating an error notification for the common signal path or node. Other embodiments will occur to those skilled in the art.

Figure 5:
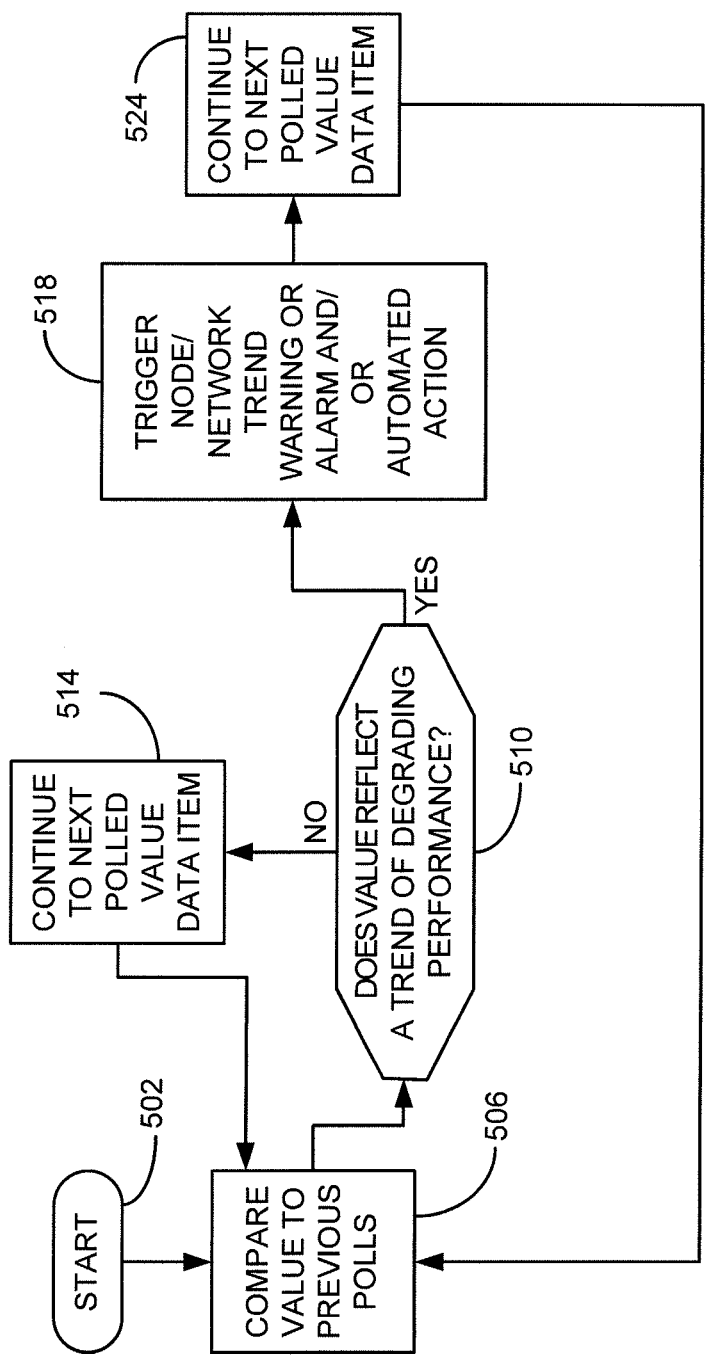
FIG. 5 is a flow chart of an additional exemplary data processing process consistent with certain embodiments of the present invention.

In order to check for trends in data at 450, any number of data analysis processes can be carried out, including the exemplary process depicted in FIG. 5 starting at 502. This process can be carried out as a more or less continuous background process in which poll values are compared to previous polls at 506 in order to check for a trend. Once the comparison is made at 505, the system determines if the polled value reflects a trend of degrading performance at 510. If not, the process continues at 514 to the next polled value data item. However, if a trend is detected at 510 (for example, steadily decreasing signal strength or steadily increasing bit error rate), an appropriate node or network trend warning or alarm can be issued at 518 or an automated action can be carried out. The process then continues to the next polled value data item at 524 and returns to 506.

Thus, in accordance with the process described, individual terminals (set top boxes) can be polled individually and the data retrieved from such a polling operation can be utilized to not only diagnosis the individual set top box, but diagnose nodes, branches, and other architectural constructs present in the cable network. The table below shows some exemplary values (variables) that can be retrieved during a polling operation consistent with certain embodiments of the present invention. Those skilled in the art will appreciate that these values may be readily available for retrieval by the set top box in many conventional designs, or could be designed into others with minimal modification. More extensive data can also be made available without departing from embodiments consistent with the present inventions.

| VALUE | DESCRIPTION |
| --- | --- |
| QAM Digital Network Health variables: | |
| QAM Channel Status | Indicates the channel status (lock == OK) for the FAT (Forward Application Transport). |
| QAM Config Data | The QAM configuration (QAM mode: 64-QAM, 256-QAM). |
| QAM SNR/CNR (Signal To Noise Ratio, Carrier To Noise Ratio) | The running average estimate of the magnitude of the error signals |
| QAM MER (Modulation Error Ratio) | MER is a measure of the ratio of the error power to the average power in an ideal QAM signal. |
| QAM AGC Value | This is the AGC (Automatic Gain Control) value of the QAM channel |
| Power AGC | Power (AGC) in dBMv. Power level in dBmV. it may have +/− 5 db differences |
| Pre-FEC BER | Pre FEC BER Error correction processing (FEC = Forward Error Processing; BER = Bit Error Rate), before FEC |
| Post-FEC BER | Post FEC BER Error correction processing (FEC = Forward Error Processing; BER = Bit Error Rate), after FEC |
| Theft of service variables | |
| Smart Card ID | Smart Card ID. Matches what is on Smart Card. Six digits = Last number of first series (version number) plus all numbers of second series (serial number). |
| Logical Channel ID | Current viewing channel |
| MPEG Video PID | Current MPEG video PID |
| MPEG Audio PID | Current MPEG audio PID |
| Service level | CA service level data |

Figure 6:
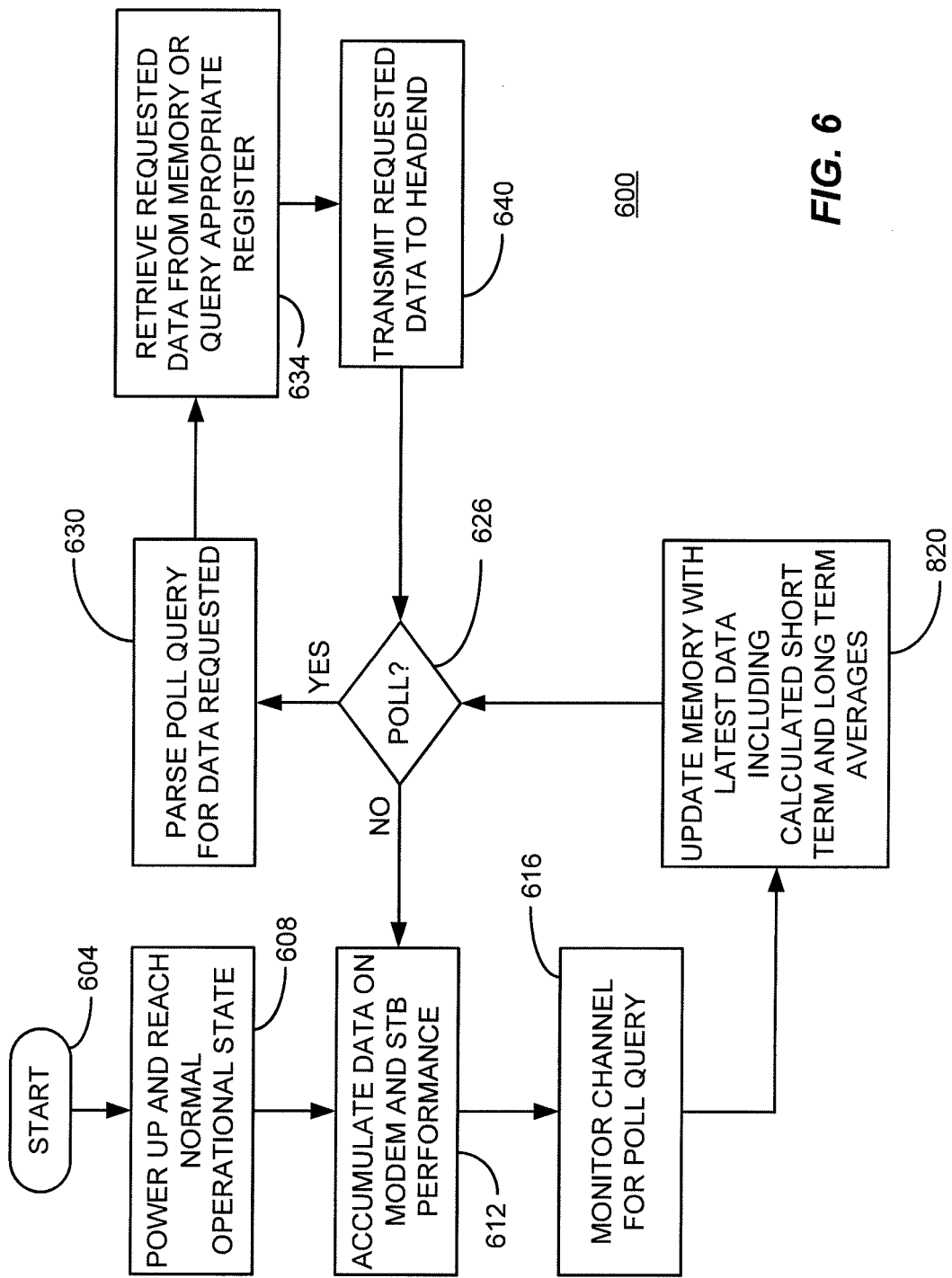
FIG. 6 is a flow chart of a service theft detection process consistent with certain embodiments of the present invention.

Referring now to FIG. 6, operation of the television set top box can be described in one exemplary embodiment according to process 600 starting at 604. At 608, the set top box powers up and reaches normal operational state. Control then passes to 612 where the set top box begins to accumulate data on the modem performance, as well as the set top box performance. Such data can include operational parameters such as those described in the table above. It is useful to note that many of these parameters can be directly related not only to the modem's performance, but to performance of the television set top box in actual operational condition. Moreover, if the set top box is not currently being used by the operator, the headend can instruct the set top box to change channels or make other necessary adjustments that are useful in further diagnosing performance related problems.

At 616, the set top box begins monitoring the data channel using the DOCSIS modem to await a polling query from the cable system headend. During its operation, the set top box may update its memory with the latest operational parameters which might include the calculated short-term and long-term averages of certain data such as bit error rates or amplifier gains. If a poll is received at 626, control passes to 630 where the poll query is parsed to determine what data are being requested in the poll. The requested data are then retrieved from memory or from an appropriate storage register at 634, and a response is transmitted to the cable system headend at 640. Control then passes back to 626 to await the next poll. When no poll is received, the set top box simply continues to accumulate data on the modem and set top box performance in the loop defined by 612, 620, 626, and back to 612.

In this manner, the set top box behaves as a network analyzer residing at each installation and is able to monitor operational parameters of the modem's operation, as well as the set top box tuner, receiver, etc. Thus, the cable system headend can collect data from any user in the network to diagnosis problems with the set top box, node, or other architectural constructs within the cable television network.

The ability to individually poll each set top box within a cable system network has other uses also. For example, the digital set top box can be utilized to report unauthorized usage beyond that which the customer has paid the cable system for. For example, use of an unauthorized smart card or otherwise altering the set top box in order to receive paid programming for which the user has not compensated the cable company for. FIG. 7 depicts process 700 for determining whether a user is receiving unauthorized access to programming for which the user has not paid starting at 704. At 708, the system selects a set top box for polling, and at 712, that set top box is polled for conditional access information or other information that can be used to detect theft of service. One example is to poll the set top box for a channel to which the set top box is currently tuned. If the channel is an unauthorized channel, the cable system operator can deduce that the user of the set top box is somehow obtaining unauthorized access to such channels. Similarly, in some embodiments of set top boxes, it may be possible to poll for codes that actually describe the conditional access rights that have been purchased by the user of the set top box. In either case, that information is retrieved from the set top box by way of polling at 712. The cable system can then retrieve conditional access information from its billing system which can be used to compare with the information received from the poll to determine whether or not the user is authorized to operate the set top box in the manner in which it is being operated at 720. If, at 726, the user is operating within the rights established by payment to the cable system operator, the process returns at 730.

However, if the information obtained from the poll at 712 establishes that the user is operating the set top box with rights that are beyond those that the billing system indicates the user should have at 734, a corrective action can be taken at 740. In one example, the cable system headend can issue a directive that disables the digital set top box, or in another alternative, the cable system headend can download corrected conditional access data or contact the customer. Other corrective actions can also be taken in a manner consistent with embodiments of the present invention. In the event the information does not indicate that the user is using services not paid for at 734, the process return at 730.

Thus, a cable television diagnostic method for a cable television network consistent with certain embodiments involves sending a polling message to a modem forming a part of a television set top box from a cable television headend via a cable television cable connection to the set top box; wherein the polling message instructs the cable television set top box to obtain an operational parameter that can be correlated to user rights associated with the set top box; receiving a response message from the cable television set top box containing the operational parameter of the television set top box; retrieving usage rights information associated with the television set top box that indicates what usage rights a user has paid for; comparing the operational parameter with the usage rights information to determine if the operational parameter indicates that the television set top box is being used outside of authorized usage rights paid for; and if the set top box is being used outside the authorized usage rights paid for, taking a corrective action.

Process 800 of FIG. 8 depicts yet another function that can be carried out using a system consistent with embodiments of the present invention starting at 802. In this embodiment, the set top box can be used as a mechanism for obtaining information for a rating service or for internal use in establishing advertising rates or programming In this embodiment, an appropriate set of set top boxes is selected for polling at 806. This set may include all set top boxes or some representative sampling. The set top boxes can be polled at 810 for information that describes the channel to which the set top box is tuned during the polling interval. This polling interval can represent a particular time slot in television programming. In this manner, the cable operator can have exact information as to which channel the particular set top box is tuned to during a particular programming time segment. These results can be compiled at 814 to determine actual viewership of a particular television program or a particular programming time slot. This information may be reported to a rating service at 818 or may be used internally. The process returns at 830.

Cable Headends are complex and dynamic environments that may be difficult and costly for personnel to keep track of, but by incorporating open-standard monitoring solutions, the present embodiment realizes an automated system capable of monitoring an HFC network from headend to customer node. The comprehensive monitoring solution described above can save valuable time by freeing personnel from repetitive tasks that can easily be automated. By analyzing data and sending out notifications, repairs can be made before the customers' viewing experience is compromised. This not only saves money by accelerating repair it also keeps the customer satisfied, reducing churn and disconnects.

Thus, a cable television method for a cable television network consistent with certain embodiments involves sending a polling message to a modem forming a part of a television set top box from a cable television headend via a cable television cable connection to the set top box; wherein the polling message instructs the cable television set top box to report a currently tuned channel of the television set top box; receiving a response message from the cable television set top box transmitted by the modem and containing the currently tuned channel of the television set top box; and compiling the currently tuned channel information from a plurality of set top boxes received in response messages to determine actual program viewing statistics for a television time slot during which the polling responses were sent.

Monitoring of backend networks in addition to the statistics gathered from advanced 2-way CPEs (Customer Premises Equipment) employing DOCSIS provides metrics on the entire cable network. When this monitoring end-to-end paradigm is applied to the MSO's network, the 100% uptime required by today's demanding customer can be better realized.

Those skilled in the art will recognize, upon consideration of the above teachings, that certain of the above exemplary embodiments are based upon use of a programmed processor. However, the invention is not limited to such exemplary embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

Those skilled in the art will appreciate, upon consideration of the above teachings, that the program operations and processes and associated data used to implement certain of the embodiments described above can be implemented using disc storage as well as other forms of storage such as for example Read Only Memory (ROM) devices, Random Access Memory (RAM) devices, network memory devices, optical storage elements, magnetic storage elements, magneto-optical storage elements, flash memory, core memory and/or other equivalent volatile and non-volatile storage technologies without departing from certain embodiments of the present invention. Such alternative storage devices should be considered equivalents.

Certain embodiments described herein, are or may be implemented using a programmed processor executing programming instructions that are broadly described above in flow chart form that can be stored on any suitable electronic or computer readable storage medium and/or can be transmitted over any suitable electronic communication medium. However, those skilled in the art will appreciate, upon consideration of the present teaching, that the processes described above can be implemented in any number of variations and in many suitable programming languages without departing from embodiments of the present invention. For example, the order of certain operations carried out can often be varied, additional operations can be added or operations can be deleted without departing from certain embodiments of the invention. Error trapping can be added and/or enhanced and variations can be made in user interface and information presentation without departing from certain embodiments of the present invention. Such variations are contemplated and considered equivalent.

Software and/or firmware embodiments may be implemented using a programmed processor executing programming instructions that in certain instances are broadly described above in flow chart form that can be stored on any suitable electronic or computer readable storage medium (such as, for example, disc storage, Read Only Memory (ROM) devices, Random Access Memory (RAM) devices, network memory devices, optical storage elements, magnetic storage elements, magneto-optical storage elements, flash memory, core memory and/or other equivalent volatile and non-volatile storage technologies) and/or can be transmitted over any suitable electronic communication medium. However, those skilled in the art will appreciate, upon consideration of the present teaching, that the processes described above can be implemented in any number of variations and in many suitable programming languages without departing from embodiments of the present invention. For example, the order of certain operations carried out can often be varied, additional operations can be added or operations can be deleted without departing from certain embodiments of the invention. Error trapping can be added and/or enhanced and variations can be made in user interface and information presentation without departing from certain embodiments of the present invention. Such variations are contemplated and considered equivalent.

While certain illustrative embodiments have been described, it is evident that many alternatives, modifications, permutations and variations will become apparent to those skilled in the art in light of the foregoing description.

What is claimed is:

1. A cable television method for a cable television network, comprising:
    sending a polling message to a modem forming a part of a television set top box from a cable television headend via a cable television cable connection to the set top box;
    wherein the polling message instructs the cable television set top box to report a currently tuned channel of the television set top box;
    receiving a response message from the cable television set top box transmitted by the modem and containing the currently tuned channel of the television set top box; and
    compiling the currently tuned channel information from a plurality of set top boxes received in response messages to determine actual program viewing statistics for a television time slot during which the polling responses were sent.

2. The method according to claim 1, further comprising generating a report of program viewing statistics.

3. The method according to claim 2, further comprising sending the report to a rating service.

4. The method according to claim 1, further comprising sending a report to a rating service.

5. The method according to claim 1, where the polling interval represents a time slot in television programming.

6. A non-transitory computer readable storage medium storing instructions which, when executed on a programmed processor, carry out the method according to claim 1.

7. A cable television method for a cable television network, comprising:
    sending a polling message to a modem forming a part of a television set top box from a cable television headend via a cable television cable connection to the set top box;
    wherein the polling message instructs the cable television set top box to report a currently tuned channel of the television set top box;
    receiving a response message from the cable television set top box transmitted by the modem and containing the currently tuned channel of the television set top box;
    compiling the currently tuned channel information from a plurality of set top boxes received in response messages to determine actual program viewing statistics for a television time slot during which the polling responses were sent;
    generating a report of program viewing statistics; and
    sending the report to a rating service.

8. The method according to claim 7, where the polling interval represents a time slot in television programming.

9. A non-transitory computer readable storage medium storing instructions which, when executed on a programmed processor, carry out a cable television method for a cable television network, comprising:
    sending a polling message to a modem forming a part of a television set top box from a cable television headend via a cable television cable connection to the set top box;
    wherein the polling message instructs the cable television set top box to report a currently tuned channel of the television set top box;
    receiving a response message from the cable television set top box transmitted by the modem and containing the currently tuned channel of the television set top box;
    compiling the currently tuned channel information from a plurality of set top boxes received in response messages to determine actual program viewing statistics for a television time slot during which the polling responses were sent;
    generating a report of program viewing statistics; and
    sending the report to a rating service.

10. The non-transitory storage medium according to claim 9, where the polling interval represents a time slot in television programming.

* * * * *